(No Model.)
S. Z. DE FERRANTI.
CONVEYING ELECTRIC ENERGY.
No. 394,837. Patented Dec. 18, 1888.
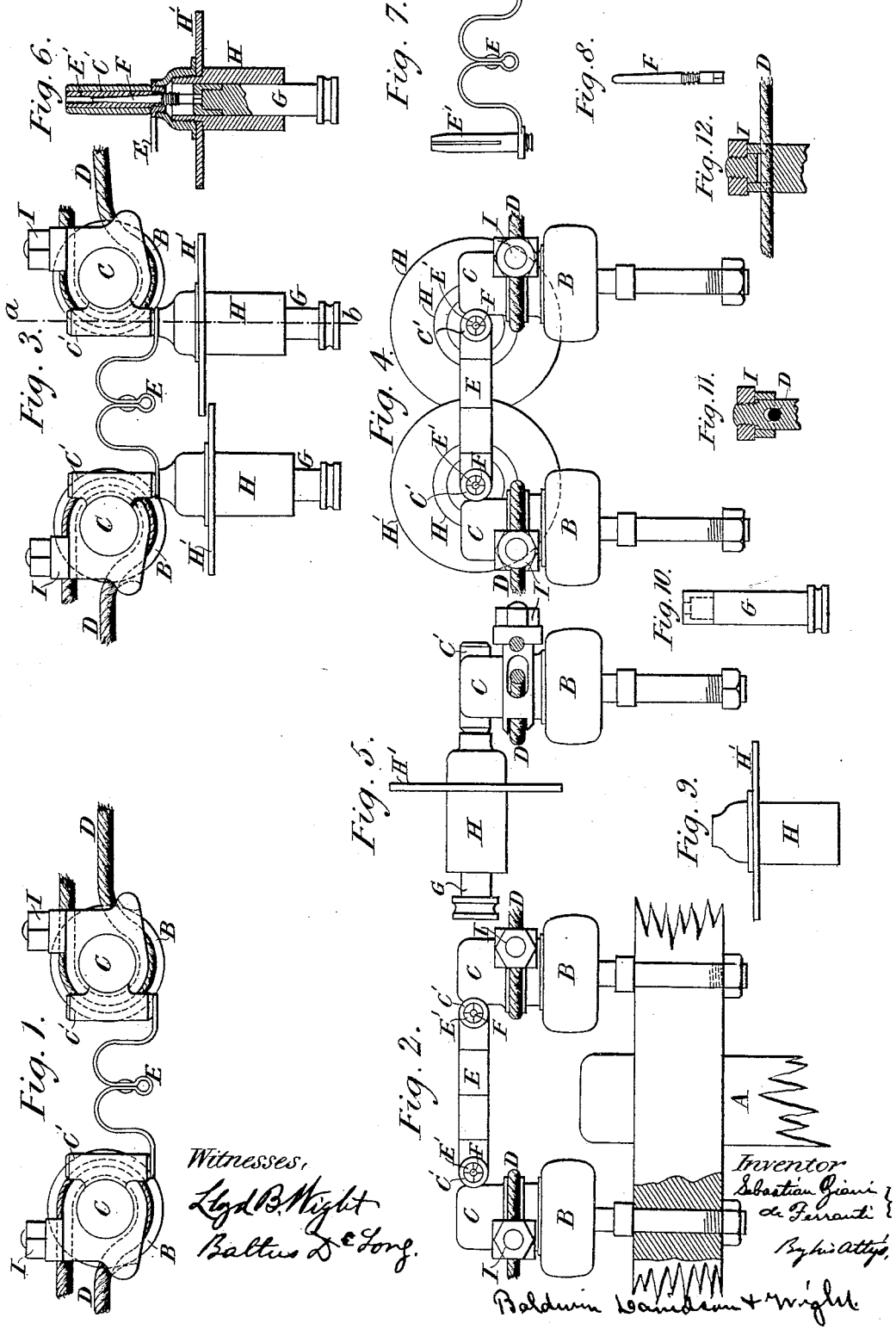
Witnesses:
Lloyd B. Wight
Baltus DeLong
Inventor
Sebastian Ziani
de Ferranti
By his Attys
Baldwin Davidson & Wight

UNITED STATES PATENT OFFICE.

SEBASTIAN ZIANI DE FERRANTI, OF HAMPSTEAD, COUNTY OF MIDDLESEX, ENGLAND.

CONVEYING ELECTRIC ENERGY.

SPECIFICATION forming part of Letters Patent No. 394,837, dated December 18, 1888.

Application filed September 24, 1888. Serial No. 286,205. (No model.)

*To all whom it may concern:*

Be it known that I, SEBASTIAN ZIANI DE FERRANTI, electrician, a subject of the Queen of Great Britain, residing at 120 Fellows Road, Hampstead, in the county of Middlesex, England, have invented certain new and useful Improvements in Conveying Electric Energy, of which the following is a specification.

This invention relates to improvements in conveying electric energy. I make use of alternating currents of high intensity, preferably derived from a dynamo-electric machine, and to convey these currents to the places where they are to be utilized I employ a conductor or cable divided into short lengths, and I attach these short lengths to insulators in separate spans from one post or support to another. Where the end of one length comes into contiguity with the end of the next length I make electrical connection between them by readily-removable short lengths of electrical conductor. To do this I secure the ends of the lengths of cable or conductor to metallic caps placed over the heads of the insulators, and at each post or support the circuit is closed by plugs at the ends of short lengths of conductor being inserted into sockets in the heads of the two adjacent insulators to which the adjacent ends of two of the main lengths or spans of the conductor or cable are secured. In order to insure good contact and also to avoid risk of the plugs escaping from the sockets, I so construct the plugs that when in place they can be expanded by a screw or wedge and made to bear tightly against the walls of the sockets. As the cables and conductors are liable to elongate, I provide for the adjustment of the length between post and post. For this purpose the end of cable or conductor is led round the insulator and back to a clip through an eye in which it is threaded, and it is then led to the metal head of the insulator and electrically connected with it. The clip is made to embrace the cable or conductor, and is shifted to such a position as is requisite to give the desired tension in the span. The same method is applicable to supporting wires, except that in this case the wire when led to the insulator is made fast to it in place of being threaded through an eye.

Figure 1 is a plan, and Fig. 2 an elevation, of a post carrying a pair of insulators, to each of which is secured the end of a length of conductor, and electrical connection made between the ends of the two conductors, in the manner above described. Figs. 3 and 4 are similar views showing a means for enabling the connection to be made or unmade safely. Fig. 5 is an end elevation of one of the insulators and key or handle for making or unmaking connection. Fig. 6 is a section through the line *a b*, Fig. 3. Fig. 7 shows the connecting-conductor separately. Fig. 8 shows separately the tapering wedge by which the plug at the end of the connecting-conductor can be expanded. Figs. 9 and 10 show two parts into which the key for making or unmaking connection is divided. Figs. 11 and 12 are sections through the clip by which the end of each length of conductor is held.

In the figures, A is the upper end of a supporting-post.

B B are insulators carried by the post at a distance apart from one another.

C C are metallic caps fixed on the top of the insulators; D D, lengths of conductors secured to these metallic caps and making contact with them; C' C', sockets cast in one piece with the caps C; E' E', hollow expansible plugs to be inserted into the sockets C' and formed one at each end of a short connecting-conductor, E.

F F are conical or tapering wedges, which can be inserted into the plugs E' to expand them. Each cone has a screw-thread at one end to screw into a corresponding thread in the end of the plug. It has also a square end or head for a key, G, to fit over to turn it. On the exterior of the end of the plug is also a screw-thread for a handle, H, to screw onto. The handle is hollow to allow of the key G to pass through it. Each of these handles is also formed with a disk, H', of insulating material projecting around it to insure safety.

To uncouple the metallic caps one from the other, the handles H can be screwed onto the plugs E', the keys G passed through the handles H and onto the square heads of the conical wedges F. By turning the keys the conical wedges can be withdrawn from the plugs E', leaving the plugs loose in the sockets, and when they have been so set free they can be withdrawn from the sockets by the handles H and taken away, together with the connecting-conductor E.

The end of each length of conductor D is, as shown, bent around the exterior of one of the caps C, and its extremity is clipped and held by a screw-clamp, I, carried by the cap. The way in which I form these clamps is clearly shown at Figs. 11 and 12.

Having now particularly described and ascertained the nature of my said invention and in what manner the same is to be performed, I declare that what I claim is—

1. The combination, with insulated supports arranged in pairs, of a conductor divided into comparatively short lengths and having adjoining ends of lengths secured to adjoining supports, and removable electrical connections between the two supports by which the ends of the conductor are electrically connected.

2. The combination, with insulated supports arranged in pairs, each support consisting of a metallic cap mounted on an insulator, of a conductor divided into comparatively short lengths and having adjoining ends of lengths secured to adjoining metallic caps, and plugs connected by a conductor and fitting into sockets in the metallic caps, whereby adjoining ends of the conductor are electrically connected.

3. The means for securing and suspending conductors or cables so as to permit of slack being taken up, consisting of the combination of the metallic caps C, the clips I thereon, in which the ends of the conductor are clamped, and electrical connections between adjoining caps, substantially as set forth.

SEBASTIAN ZIANI DE FERRANTI.

Witnesses:
 JNO. H. WHITEHEAD,
 24 *Southampton Buildings, London.*
 WALTER J. SKERTEN,
 17 *Gracechurch Street, London, E. C.*